Oct. 5, 1948.   H. A. SCHLIEDER   2,450,739
LEVEL RESPONSIVE CONTROL DEVICE
Filed Jan. 15, 1945   3 Sheets-Sheet 1

INVENTOR.
HAROLD A. SCHLIEDER
BY W. G. Sullivan
ATTORNEY

Oct. 5, 1948. H. A. SCHLIEDER 2,450,739
LEVEL RESPONSIVE CONTROL DEVICE
Filed Jan. 15, 1945 3 Sheets-Sheet 2

INVENTOR.
HAROLD A. SCHLIEDER
BY W. G. Sullivan
ATTORNEY

Patented Oct. 5, 1948

2,450,739

UNITED STATES PATENT OFFICE 2,450,739

LEVEL RESPONSIVE CONTROL DEVICE

Harold Augustus Schlieder, Erie, Pa., assignor to Northern Equipment Company, Erie, Pa., a corporation of Pennsylvania Application January 15, 1945, Serial No. 572,957

11 Claims. (Cl. 122—451.1)

This invention relates to level responsive means associated with steam generators, and more particularly to level responsive means of this type adapted to actuate a control device at pre-determined high and low water levels in the generator despite wide variations in steam pressure within the generator.

Control devices employed in association with steam generators such as boilers and adapted to be actuated at pre-determined water levels are utilized for various purposes. For example, it may be desired to energize a horn or whistle to give an audible warning when high and low level water limits are reached which correspond to visible limits in the gauge glass at which an operator would normally adjust the flow of feed water to the boiler, it may be desired to automatically stop and start a pump at such limits supplying feed water to small boilers, or it may be desired to automatically regulate a valve in a liquid fuel supply line for the boiler at such limits.

Two general types of water level responsive means have previously been employed for actuating such control device, namely, a float operated or body displacement unit and a thermostat or unit which expands and contracts in accordance with the relative amount of steam and water in the unit. The power available for actuating the control device in a float operated unit corresponds to the difference in density between the steam and water and at high steam pressures the density difference and resultantly the power available approaches zero. A thermostatic unit is not subject to decrease in power available with increase in steam pressure and so long as the unit responds solely to level variations such units will function satisfactory. However, prior thermostatic units with which I am familiar respond both to level and steam pressure variations so that the control device is not actuated at a desired or substantially the same water level where wide variations in steam pressure within the boiler occur. For example, a unit intended to signal an alarm at a pre-determined high water level may signal at normal level and a low steam pressure due to increased contraction resulting from temperature drop in the unit at low pressure.

The present invention is designed to overcome the aforementioned disadvantages found in prior devices of this general type and provide a device wherein the power available for actuating the control device is unaffected by variations in steam pressure, and wherein compensating means are provided for variation in steam pressure whereby the control device is actuated at the desired water level despite wide variations in steam pressure within the generator or boiler.

It is an object of the invention to provide means to actuate a control device at a pre-determined water level in a steam generator which will function accurately to actuate the control device at said level despite wide variations in steam pressure within the generator.

Another object of the invention is to provide means to accurately actuate a control device at a pre-determined water level in a steam generator and wherein the power available to actuate the control device at said level remains constant despite wide variations in steam pressure within the generator.

Another object of the invention is to provide thermally responsive means associated with a steam generator for actuating a control device at a pre-determined water level in the generator and wherein compensating means are provided for the thermal effect of steam pressure variations.

Another object of the invention is to provide means to accurately actuate a control device at different pre-determined water levels in a steam generator over a wide range of steam pressures within the generator.

Another object of the invention is to provide level responsive means of the above type which is of relatively simple construction, which is easy to install, and which is easily adjustable.

Other objects of the invention and the invention itself will become increasingly apparent from a consideration of the following description and drawings wherein.

Figure 1:
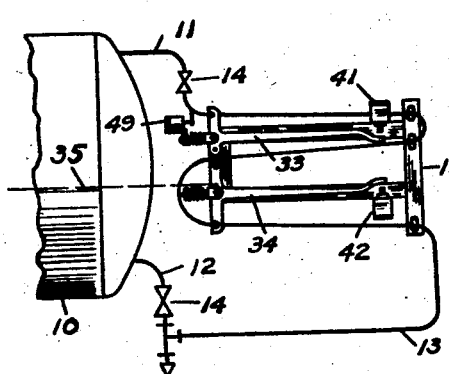
Fig. 1 is a diagrammatic view of my improved apparatus showing the position of the parts with the steam generator or boiler water at normal level.

Referring now to the drawings, and particularly Figs. 1 to 7 inclusive, a conventional steam generator or boiler indicated at 10 has a conduit 11 extending from the steam space and a conduit 12 extending from the water space thereof. A generally serpentine form thermostatic expansion tube 13 communicates with conduits 11 and 12 through valves 14. A preferably steel frame generally indicated at 16 is preferably formed of vertically extending channel members 17 and 18 connected by horizontal channel members 19 and 20.

A block 22 welded or otherwise secured to horizontal member 19 and extending transversely thereto has the stem of a clevis 23 slidably projected therethrough, the stem being loaded by a spring 24 which abuts block 22 and continuously urges the clevis to the left or away from vertical member 18. A clevis 26 is similarly mounted on the lower horizontal frame member 20.

Each clevis pivotally engages a generally T shaped lever at the juncture of the lever arms by pins indicated at 27 and 28. Tube 13 comprises straight portions 29, 30, and 31 disposed at different elevations and slightly inclined to the horizontal in alternate directions to provide suitable drainage. The middle tube portion 30 has fingers 32 secured thereto by welding which extend vertically and are received within and pivotally connected to forked ends formed on the short arms of the T levers indicated at 33 and 34. The opposite end of each short arm is also forked to straddle the upper tube portion 29 and lower tube portion 31, the tube portions having collars 36 secured thereto provided with transverse pins 37 at each side thereof which engage slots provided in the forks. The right end of each tube portion has fingers 38 welded thereto which are bolted to vertical frame member 17 whereby any expansion or contraction of the tube portions results in movement at the left or free ends of the tube portions. Tube 13 is maintained spaced from frame 16 by the short arms of levers 33 and 34, the fixed tube portions being spaced by bolt collars abutting frame member 17 and fingers 38.

The position of levers 33 and 34 at high and low water level limits relative to the lever positions at normal water level may be utilized in various ways to cause a controlled device to function or cease functioning at such levels. Lever movement is illustrated in Figs. 1 to 4 as operating an alarm system comprising switches 41 and 42 which energize an electrical circuit generally indicated at 43 adapted to actuate a horn or bell 44. Switch 41 has an extension which is bolted to horizontal channel member 19 and switch 42 is supported in a similar manner from member 20. The switches may be of any conventional type wherein a stem 47 is movable by pressure to cause engagement of the switch contacts and energize an electrical circuit and upon release of pressure the contacts disengage. Adjustable contact elements 48 are mounted on the long arms of levers 33 and 34 for operating the switches by engagement with stems 47. A switch 49 supported by block 22 is operable by an adjustable contact 51 secured to upper tube portion 29 whereby as the tube portion contracts a predetermined amount the switch contacts are disengaged.

The operation of the apparatus so far described will now be explained. The elevation of the tube portions 30 and 31 determines the high and low level alarm points. Tube portion 29 will probably always be full of steam and serves as a pressure compensating element for the high alarm. The clevis springs 24 pull the slotted ends of the levers 33 and 34 firmly against the pins 37. Considering first the lower tube portion 31, the right end of this tube portion is rigidly secured to the frame 16 and expansion or contraction of this portion causes the left end to move with respect to the frame carrying with it the slotted end of the short arm of lever 34. This causes the lever to pivot about its connection with the middle tube portion 30 and elevate or depress the contact 48 at the right end of the lever. When the middle tube portion 30 changes length the pin connected short arm of the lever 34 moves about the slotted end as a fulcrum elevating or depressing the right end of the lever. The upper lever 33 moves in a similar manner by relative expansion and contraction of tube portion 29 and 30.

Figure 2:
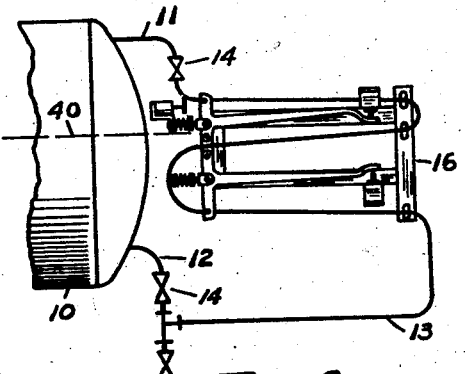
Fig. 2 is a view similar to Fig. 1 showing the position of the parts at high water level.
Figure 3:
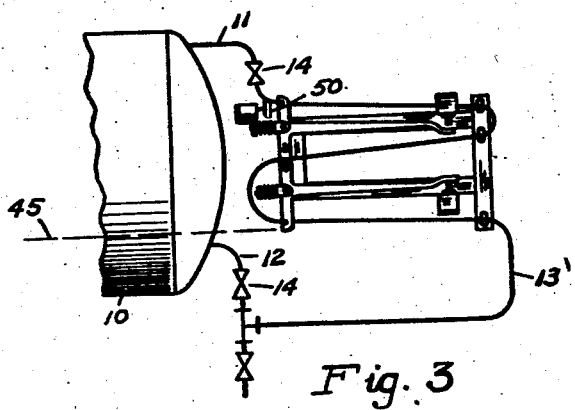
Fig. 3 is a view similar to Fig. 1 showing the position of the parts at low water level.
Figure 4:
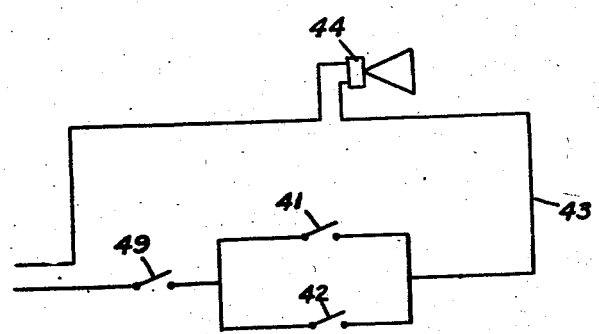
Fig. 4 is a diagrammatic view of an electrical circuit controllable by the level responsive means which I may employ for actuating a level alarm or other electrically operable apparatus.

At normal water level, indicated at 35 in Fig. 1, tube portions 29 and 30 are full of steam. Changes in operating pressure cause the tubes to react equally. The fulcrum points of the upper lever 33 move together and the lever does not rotate but moves only in a horizontal direction. When water enters tube portion 30 it contracts resulting in upward movement of the right end of lever 33. As illustrated in Fig. 2, the high level alarm will sound when the level reaches line 40 or when tube portion 30 is substantially filled with water but the point at which the high level alarm sounds can be adjusted so that the alarm sounds when the water just enters tube portion 30. Thus, even though the water enters and leaves tube portion 30 several times in rapid succession and the water gets somewhat heated a slight temperature change in tube portion 30 is sufficient to sound the alarm.

At normal level tube portion 30 is full of steam and tube portion 31 is full of water. When water drains out of tube portion 31 both tube portions 30 and 31 are full of steam and the lever 34 will always take the same position regardless of pressure. Lever 34 will move horizontally at different pressures but this will not affect the low level alarm.

Lever 34 can be adjusted to make contact with switch 42 when nearly all the water has drained out of tube portion 31. When the level is restored to tube portion 31, only a small contraction is needed to open the low alarm switch 42. Therefore, it is not necessary to fully cool tube portion 31 before the alarm stops.

It will be noted that the tube portions have a slight slope. In addition to facilitating drainage, the slope of tube portion 30 helps maintain constant, irrespective of pressure, the point where the high level alarm sounds. With the boiler pressure near zero, the liquid levels in the boiler and tube are substantially equal because the density of the liquid in the boiler and tube is nearly the same. As the steam pressure and temperature increases, the density of the liquid in the boiler becomes lower with the result that a higher head of water in the boiler is required to balance the head of water in the tube.

For example, the upwardly extending part of tube 13 including the portions 29, 30 and 31 may be considered as one leg of a monometer; the other leg being conduit 12 and that portion of the boiler immediately above conduit 12. The same steam pressure exists in the boiler and tube 13 but the water temperature is not the same since the tube is mounted outside the boiler away from the heat of the furnace. There is relatively little circulation in tube 13 so radiation soon lowers the water temperature in the tube and although at the surface the tube water is at steam temperature, a short distance below the surface it may approach room temperature with the result that the average tube water temperature is much lower than boiler water temperature.

The level responsive means is connected to one end of the boiler and the fluid in the boiler immediately above conduit 12 is out of the path of steam flow so that the liquid in this zone below line 35 (Fig. 1) is for all practical purposes water and since the density of a liquid is a function of temperature, the density of this water falls relative to the density of water in the tube as the boiler pressure increases. In other words, the density of the boiler water in this zone varies inversely with the pressure due to the pressure-temperature relationship.

The water level may vary in the loop portion connecting the left end of straight portions 30 and 31 as the boiler water level varies without water entering portion 30 or steam entering portion 31. So long as steam fills both straight portion 29 and 30 lever 33 is not rocked to a position actuating switch 41 but may be moved horizontally with steam pressure variation due to resultant equal temperature change in portions 29 and 30. In other words, under these conditions straight portion 29 acts as a compensating means preventing movement of lever 33 to an actuating position under thermal variation due to steam pressure change in tube portion 30. The high level alarm switch 41 is operated by the contraction of straight portion 30 relative to straight portion 29. At high steam pressures the water level in straight portion 30 is lower with respect to the gage glass or boiler but the level in straight portion 30 need not rise very high before sufficient contraction is obtained to operate switch 41, since the temperature differential between the steam and water is high. On the other hand, at low steam pressures, the level in straight portion 30 is higher with respect to the gage glass as it enters portion 30 but the temperature differential is less, so that the water must rise considerably in portion 30 before sufficient contraction is obtained to operate switch 41. Thus, by properly selecting the slope of portion 30, the two effects are counter-balanced and the high water alarm rings at a fixed point in the gage glass, irrespective of pressure. Over the present boiler pressure ranges the shift in water level in a thermostatic tube is in the order of two inches whereas conventional thermostatic tubes have a considerably greater drop or slope rendering them unsuitable as an alarm actuating means, where the alarm point in the gage must be fixed irrespective of pressure. By selecting an ideal slope for tube portion 30 exactly counter-balancing the two effects described and covering the level change due to pressure variations a simple pressure compensating means is provided.

If the level happens to be in the middle of portion 30 and a pressure change occurs, a similar counter-balance takes place. For example, assume the pressure increases. It might appear that portion 30, being partly full of water, would not heat up as much as portion 29 which is full of steam. However, as the pressure rises, the level in portion 30 falls with respect to the gage glass (which is constant) resulting in sufficient heating to make the total expansion of portion 30 substantially the same as portion 29. Another factor that contributes to maintaining the change in length of portion 29 and 30 substantially the same with pressure variation is the variation in heat loss through the tube walls with temperature change. For example, as the temperature increases the heat loss is greater and the steam in the tube condenses faster. The hot condensate runs into the water filled portion of the tube increasing the temperature at the water filled part of straight portion 30. Conversely, with a drop in pressure the rate of condensation is reduced and the water end of the tube loses its heat by radiation. Thus, the only movement of lever 33 is in a horizontal direction.

The low level alarm or switch 42 is also adapted to be actuated at a given level in the gage glass regardless of pressure. Straight portion 31 is relatively horizontal or has a very slight slope and the adjustment is such that switch 42 is not closed until the water is substantially emptied from portion 31 or when both portion 30 and 31 are substantially filled with steam. At this time the temperature of portions 30 and 31 are equal and lever 34 always takes the same actuating position irrespective of pressure. It is true that lever 34 may be rocked to some degree with variation in steam pressure in portion 30 when portion 31 is filled with water but since the ultimate position for actuating switch 42 is the same it is immaterial what position lever 34 starts from in moving to actuating position. It will be noted that the water connection to the drum is at a point only slightly below the low water level line 45, preferably about two inches below the bottom of straight portion 31. Thus, at low water the maximum head above the connection is slight and since the water in the tube immediately below the steam is almost the temperature of the steam, there is no appreciable difference in density, and the water level in the tube would be the same as in the drum or boiler.

The electrical circuit 43 has a horn or bell in series with the power leads and the switches 41 and 42 are also in series with the power leads and in parallel with each other. The switch 49 is also connected in series with the power leads and is adjusted to open the circuit before the unit cools to room temperature when the boiler is removed from service. When the unit is out of service tube portions 30 and 31 eventually reach the same temperature which would cause the low level alarm switch 42 to close in the same manner as would occur with low water level. To prevent the alarm sounding at room temperature the cut out switch 49 is adjusted to open due to cooling and contraction of tube portion 29 prior to closing of switch 42.

In cases where it is desired to employ the switches to actuate an alarm system the high level alarm is adapted to stop sounding when tube portions 29 and 30 approach the same temperature. If water would accidentally flow into portion 29, tube portion 29, 30, and 31 might approach the same temperature and switch 41 would open and break the circuit to the alarm which would be contrary to the results desired. However, portions 30 and 31 would be at the same temperature and would cause switch 42 to close. Thus, one or the other switch would be closed as long as there is high water.

Figure 5:
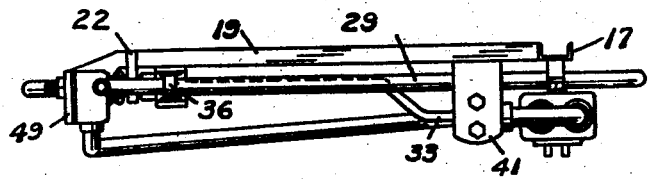
Fig. 5 is an enlarged plan view showing a portion of the apparatus illustrated in Fig. 1.
Figure 6:
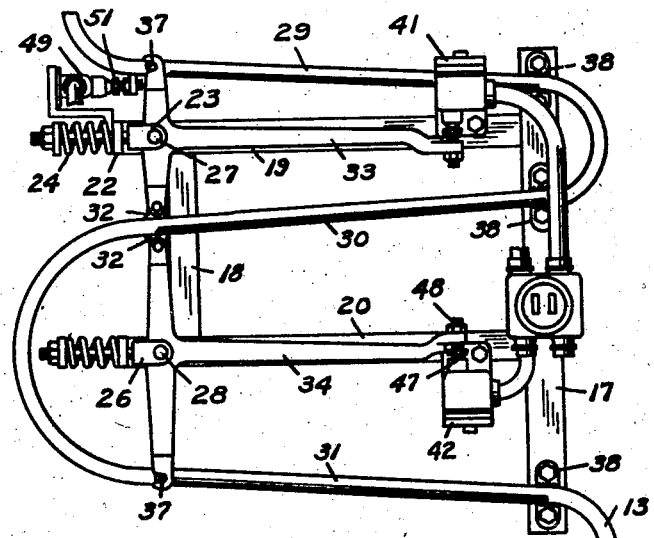
Fig. 6 is a side elevational view of the apparatus of Fig. 5.
Figure 7:
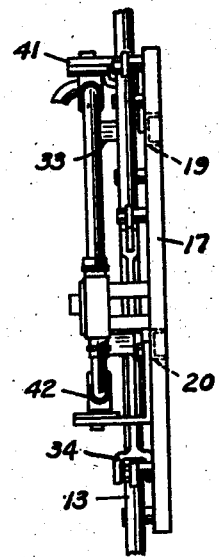
Fig. 7 is an end elevational view of the apparatus of Fig. 5.
Figure 8:
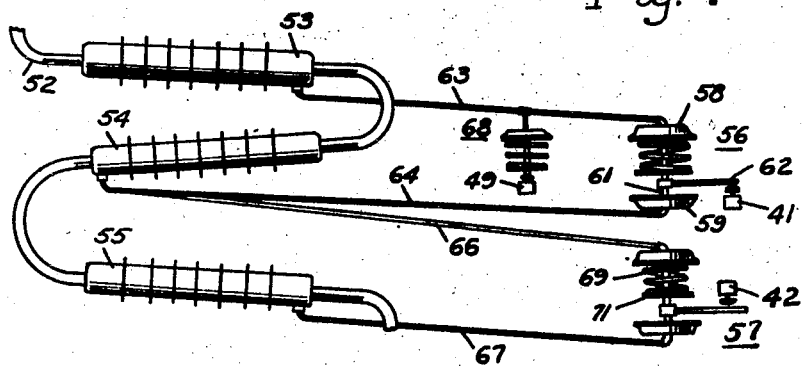
Fig. 8 is a diagrammatic view showing a modification of the invention embodying fluid pressure generators and fluid pressure motors.

Referring now to Fig. 8, I have shown a modification of my invention wherein the tube 52 is similar to the tube 13 previously described but contraction and expansion of the tube portions is not relied on for the primary actuating force controlling the operation of switches 41, 42, and 49. The upper straight tube portion, corresponding to portion 29 of Fig. 5, is encased by a spaced tube sealed at its ends with tube 52 and forming a chamber which receives a volatile fluid. Tubes 54 and 55 form similar chambers with straight portions of tube 52 corresponding to portions 30 and 31 of tube 13, illustrated in Fig. 5.

Fluid pressure motors generally indicated at 56 and 57 are similar in construction and comprise an upper chamber 58 and a lower chamber 59. The lower wall of chamber 58 and the upper wall of chamber 59 are formed by diaphragms which are inter-connected by a stem 61. Each stem 61 has a horizontal contact arm 62 rigidly secured thereto which is adapted to engage the stems 47 of the switches 41 and 42 to energize the circuit 43. A conduit 63 connects the tube 53 with chamber 58 of motor 56 and a conduit 64 connects tube 54 with the lower chamber 59 of motor 56. In a similar manner motor 57 is connected to tube 54 by a conduit 66 and to tube 55 by a conduit 67. One side of each diaphragm is exposed to atmospheric pressure and compression springs 69 bear against the exposed side of the diaphragms forming the upper chambers of the motors. The lower convolution of each spring bears against a normally fixed but adjustable abutment 71.

A fluid pressure motor 68 having a single diaphragm chamber communicates with conduit 63 and the stem thereof normally maintains switch 49 closed. In operation, the fluid pressure in the upper and middle generator chambers formed by the tubes 53 and 54, will be the same since the encased straight portions of tube 52 will both be filled with steam. Spring 69 is adjusted so that under these conditions arm 62 will be maintained out of contact with switch 41 and the position of arm 62 will not be influenced by variations in steam pressure. When the portion encased by tube 54 becomes filled with water the resultant drop in fluid pressure in chamber 59 of motor 56 will permit stem 61 and arm 62 to be moved downwardly against the pressure of spring 69 to close switch 41 and operate the high level alarm. In a similar manner switch 42 will be closed when water drains out of the portion of tube 52 encased by tube 55 to operate the low level alarm. When the unit is out of service and the pressure drops in conduit 63 switch 49 will be opened and prevent the alarm from sounding due to the pressure in conduits 66 and 67 reaching the same value.

Figure 9:
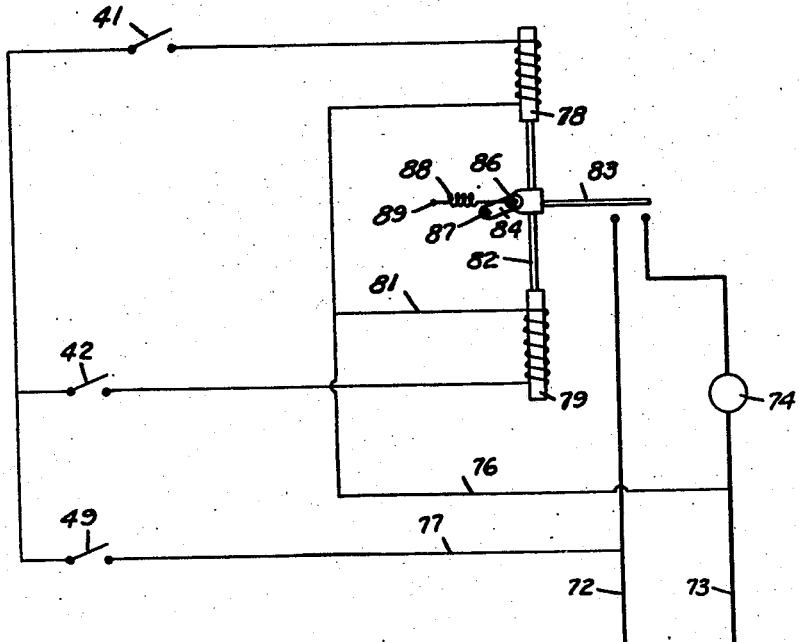
Fig. 9 is a diagrammatic view of an electrical circuit I may employ comprising a relay circuit for an electric motor or the like and wherein the relay switch includes a toggle arrangement.

Referring now to Fig. 9, I have shown a modified electrical circuit wherein the actuation of the switches 41 and 42 control actuation of a feed water pump motor instead of an alarm. A relay circuit comprises power leads 72 and 73 and a motor 74. Switch 49 will be normally closed as described in connection with the modification of Figs. 5 and 8. Switch 41 is connected in series with switch 49 and across the power leads 72 and 73 by lines 76 and 77. A line 81 connects switch 42 to lines 76 and 77 in parallel with switch 41. A solenoid 78 is controlled by switch 41 and a solenoid 79 by switch 42. The solenoid cores are inter-connected by a stem 82 which has a switch arm 83 adapted to close the relay circuit. The stem is provided with a toggle joint comprising a link 84 slot connected to the stem as indicated at 86 and pivoted to a fixed support at 87. A tension spring 88 is secured to the pivotal connection 86 and to a fixed support at 89.

At normal water level when the unit is in service switch 49 will be closed and the switches 41 and 42 will be open with the relay switch arm in open position. When the water level drops out of tube portion 31 switch 42 is closed as previously explained energizing solenoid 79 and closing the relay or motor circuit to start the pump. The pump will continue operating until switch 41 is closed which energizes solenoid 78 and opens the relay circuit. If the water level accidentally goes on up into tube portion 29 considerable cold water would be drawn through tube portions 30 and 31 and these portions would eventually become equalized in temperature. This would effect closing of switch 42 and would ordinarily result in the pump being re-started in spite of high water. However, switch 41 is also closed so that the two solenoids counter-balance each other and the switch arm 83 would not be moved downwardly to close the relay circuit and start the pump. This is due to the fact that the net force on the stem 82 would be zero and the relay switch arm 83 would continue to be held in its open position by the spring action of the toggle joint. Thus, the pump will not start until the water level again drops out of tube portion 31 which is the desired operation.

Although I have shown preferred forms of my invention I contemplate that numerous and extensive departures may be made therefrom without departing from the spirit of my invention and the scope of the appended claims.

What I claim is:

1. The combination with a steam generator and a control device, of means adapted to actuate the control device at a predetermined water level in the generator despite wide variations in generator steam pressure, said means comprising a conduit communicating with the steam and water spaces of the boiler and having at least two straight portions slightly inclined from the horizontal and disposed at different elevations, a first of said straight portions being disposed substantially at said pre-determined water level, thermally responsive means associated with both said straight portions including an element movable to a position actuating the control device, said element being movable in a given horizontal direction upon substantially equal and like thermal change in both said straight portions, means yieldingly resisting movement of the element in said direction, the yielding means being adapted to assist movement of said element in an opposite horizontal direction upon substantially equal and like thermal change in said straight portions opposite to the first mentioned thermal change the second straight portion being adapted to compensate for variations in steam pressure whereby an increase in steam pressure in the conduit will be ineffective to move said element to actuating position, and a change in water level displacing the fluid normally contained in said first portion will effect movement of the element to actuating position.

2. The combination with a steam generator and a pair of control devices each having an open and closed position, of means adapted to actuate said control devices at pre-determined high and low water level in the generator, said means comprising a conduit communicating with the steam and water spaces of the generator and having three straight portions slightly inclined to the horizontal disposed at different elevations, a first portion being disposed above the pre-determined high level, the second portion being disposed substantially at the pre-determined high level, the third being disposed substantially at the pre-determined low level, thermally responsive means associated with each of said portions, a control device actuating element movable under the joint influence of the thermally responsive means associated with the first and second conduit portions whereby when both portions are filled with steam, variation in steam pressure will be ineffective to move said element towards actuating position, and when the second portion is substantially filled with water the element will be moved to actuating position, a second control device actuating element movable under the joint influence of the thermally responsive means associated with the second and third conduit portions whereby when the third portion is filled with water, variations in steam pressure will be ineffective to move the element to actuating position, and when the third portion is filled with steam the element will be moved to actuating position, and each of said elements being adapted to actuate a different control device.

3. The combination with a steam generator and a pair of two position control devices, of means adapted to actuate said control devices at pre-determined high and low water levels in the generator despite wide variations in generator steam pressure, said means comprising a serpentine form conduit communicating with the steam and water spaces of the generator and having three straight portions slightly inclined to the horizontal and substantially co-extensive in length disposed at different elevations, a pair of T-shaped levers each pivotally supported at the juncture of the arms, the short arm of one lever being pivotally connected to the top and intermediate straight portions, the short arm of the other lever being pivotally connected to the intermediate and lower straight portions, the long arm of each lever being adapted to actuate a different control device, the intermediate straight portion being disposed substantially at the pre-determined high water level and the lower straight portion at the pre-determined low water level, the top straight portion compensating for steam pressure variations whereby when both the top and intermediate portions are filled with steam their associated lever is prevented from moving towards actuating position and when the intermediate portion is filled with water the said lever is moved to actuating position, and the intermediate straight portion compensating for steam pressure variation whereby when the intermediate and lower straight portions are filled with steam their associated lever is held in actuating position and when the lower straight portion is filled with water the said lever moves from actuating position.

4. The combination as described in claim 3 and wherein the pivotal supports for the levers are shiftable in the direction of the straight portion to accommodate expansion and contraction of the straight portion tending to move the levers in the direction of the straight portions without rocking.

5. The combination as described in claim 3 and wherein adjustment means are provided for varying the amount of rocking movement required by the long arm of each lever to actuate its associated control device.

6. The combination as described in claim 3 and wherein the control devices comprise a pair of electrical switches connected in parallel with each other and in series with a controlled mechanism, and a third switch is adapted to break the circuit to both the other switches when actuated by cooling of the conduit substantially to room temperature.

7. The combination with a steam generator and a pair of control devices, of means for actuating said control devices at predetermined high and low water levels in the generator, said means comprising a serpentine form conduit communicating with the steam and water spaces of the generator and having three straight portions slightly inclined from the horizontal disposed at different elevations, the first of said portions being disposed above the predetermined high level, the second said portion being disposed substantially at the pre-determined high water level, the third said portion being disposed substantially at the pre-determined low water level, an individual fluid pressure generator associated with each said portion, a first fluid motor connected with the pressure generators of the first and second tube portions whereby a control device actuating element will be moved to actuating position responsive to different thermal conditions between said first and second portions, and a second fluid pressure motor connected with the pressure generators of the second and third tube portions whereby a second control device actuating element will be moved to actuating position responsive to substantially the same thermal condition in said second and third portions.

8. The combination with a steam generator, a pair of control devices, and mechanism controlled by the control devices, of means for actuating the control devices at pre-determined high and low water levels in the generator, despite wide variations in steam pressure within the generator, said means comprising a tube connected to the steam space of the generator above the high water level point and below the low water level point, the tube being formed to provide three straight horizontally extending portions disposed at different elevations, the top portion being disposed above the high level, the middle portion being disposed at the high level, and the bottom portion at the low level whereby during level fluctuations between the high and low levels the top and middle portion will be filled with steam and the bottom portion with water, means associated with the top and middle portions operable by differential thermal conditions in said portions whereby one of said control devices will be actuated when the middle portion is substantially filled with water at high level, said means being ineffective to actuate said control device due to steam pressure variations resulting in equal thermal change in both said portions, a second means associated with the middle and bottom tube portions operable to actuate the second control device at low level when the bottom portion is drained of water, and said second means being ineffective to actuate the second control device due to steam pressure variations when the bottom tube portion is filled with water.

9. The combination with a steam generator and a control device, of means for accurately actuating the control device at a predetermined water level in the generator despite wide variations in generator steam pressure, said means comprising a conduit communicating with the steam and water spaces of the boiler having a substantially horizontal straight portion disposed at said pre-determined level, means movably responsive to thermal variation in the straight portion for actuating the control device, compensating means responsive to thermal variation in another portion of the conduit operatively connected to the movable means whereby thermal variation in both conduit portions in like degree will be ineffective to cause movement of the movable means to a position actuating the control device, and a change in liquid level to said pre-determined level will cause thermal variation in said straight portion moving the movable means to actuate the control device, the movable means being movable in a given horizontal direction upon thermal change in like degree in both said conduit straight portion and said other conduit portion, and means yieldingly resisting movement of the movable means in said direction.

10. The combination with a boiler, of means adapted to actuate electrical switch means at pre-determined high and low level points in the boiler despite wide variations in boiler steam pressure, said means comprising a serpentine form thermostatic tube communicating with the steam and water spaces of the boiler and having straight portions slightly sloped and disposed at different elevations, the upper straight portion being above the high water level, the middle portion being substantially at the high water level, the lower portion being substantially at the low water level, a frame longitudinally aligned with the straight portions, one end of each straight portion being secured to the frame and the opposite end being free to move under thermal change, a pair of T levers pivotally and slidably connected to the frame at the juncture of the arms, one lever having its short arm pivotally connected to the upper and middle tube portions whereby the long arm will be rocked by differential thermal change in said portions, the other lever having its short arm pivotally connected to the middle and lower portions whereby the long arm will be rocked by differential thermal change in said portions, and switch means mounted on the frame adapted to be actuated when either of the long arms are rocked to contact the switch means.

11. The combination with a boiler, a relay circuit including a motor, a control switch for the relay circuit including a switch arm, a pair of opposed action solenoids connected to the switch arm, toggle means normally maintaining the switch arm in open position, a pair of switches each adapted to control energization of a different solenoid, water level responsive means for actuating said switches at a pre-determined high and low water level, said level responsive means comprising a tube connected to the steam and water spaces of the boiler, the tube having three straight portions slightly sloped from the horizontal and disposed at different elevations, the top being disposed above the pre-determined high water level, the middle portion being disposed substantially at the pre-determined high level, the bottom portion being disposed substantially at the pre-determined low level, means responsive to a given temperature differential between the top and middle portions for closing one of said switches and energizing its associated solenoid to open the relay circuit, means responsive to substantially the same temperature in the middle and bottom portions for closing the other switch and energizing its associated solenoid to close the relay circuit, and the toggle means being adapted to hold the relay circuit open when both solenoids are energized.

HAROLD AUGUSTUS SCHLIEDER.

REFERENCES CITED

The following references are of record in the file of this patent:

FOREIGN PATENTS

| Number | Country | Date |
| --- | --- | --- |
| 118,686 | Great Britain | Sept. 11, 1918 |